United States Patent
Cavarroc et al.

(10) Patent No.: US 12,492,463 B2
(45) Date of Patent: Dec. 9, 2025

(54) METHOD FOR FORMING A LAYER OF ALUMINA AT THE SURFACE OF A METALLIC SUBSTRATE

(71) Applicant: SAFRAN, Paris (FR)

(72) Inventors: Marjorie Christine Cavarroc, Moissy-Cramayel (FR); Stéphane Knittel, Moissy-Cramayel (FR); Jolenta Sapieha, Montreal (CA); Ludvik Martinu, Montreal (CA); Florence Bergeron, Montreal (CA); Simon Loquai, Montreal (CA)

(73) Assignee: SAFRAN, Paris (FR)

( * ) Notice: Subject to any disclaimer, the term of this patent is extended or adjusted under 35 U.S.C. 154(b) by 315 days.

(21) Appl. No.: 17/610,975

(22) PCT Filed: Apr. 24, 2020

(86) PCT No.: PCT/FR2020/050708
§ 371 (c)(1),
(2) Date: Nov. 12, 2021

(87) PCT Pub. No.: WO2020/229747
PCT Pub. Date: Nov. 19, 2020

(65) Prior Publication Data
US 2022/0259717 A1    Aug. 18, 2022

(30) Foreign Application Priority Data

May 15, 2019   (CA) ................................ CA 3043564

(51) Int. Cl.
*C23C 14/06* (2006.01)
*C23C 14/00* (2006.01)
(Continued)

(52) U.S. Cl.
CPC ...... *C23C 14/0694* (2013.01); *C23C 14/0057* (2013.01); *C23C 14/025* (2013.01);
(Continued)

(58) Field of Classification Search
CPC .............. C23C 14/081; C23C 14/0057; C23C 14/0694; C23C 14/165; C23C 14/24;
(Continued)

(56) References Cited

U.S. PATENT DOCUMENTS 5,503,874 A     4/1996  Ackerman et al.
6,132,890 A *  10/2000  Harada ................... C23C 4/073
                                                    428/685
(Continued)

FOREIGN PATENT DOCUMENTS

CA      2 357 583 A1    3/2002
CN      102325924 A     1/2012
(Continued)

OTHER PUBLICATIONS

NR First Office Action as issued in Chinese Patent Application No. 202080036200.6, dated Jun. 29, 2023.
(Continued)

*Primary Examiner* — Michael A Band
(74) *Attorney, Agent, or Firm* — Pillsbury Winthrop Shaw Pittman LLP

(57) ABSTRACT

A method for forming a layer of alumina on the surface of a metal alloy substrate including aluminium, includes depositing a first aluminium layer on a surface of the metallic substrate, depositing a second layer by vapour-phase deposition on the first layer, the second layer comprising aluminium, a halogen and oxygen, and heat treatment of the substrate coated with the first and second layers under oxidising atmosphere in order to form the layer of alumina at the surface of the metallic substrate.

9 Claims, 3 Drawing Sheets

(51) Int. Cl.
| | |
|---|---|
| C23C 14/02 | (2006.01) |
| C23C 14/08 | (2006.01) |
| C23C 14/16 | (2006.01) |
| C23C 14/24 | (2006.01) |
| C23C 14/35 | (2006.01) |
| C23C 14/58 | (2006.01) |
| C23C 16/40 | (2006.01) |
| C23C 16/50 | (2006.01) |
| C23C 28/00 | (2006.01) |
| C23C 28/04 | (2006.01) |

(52) U.S. Cl.
CPC ............ *C23C 14/081* (2013.01); *C23C 14/16* (2013.01); *C23C 14/165* (2013.01); *C23C 14/24* (2013.01); *C23C 14/35* (2013.01); *C23C 14/5806* (2013.01); *C23C 14/5853* (2013.01); *C23C 16/403* (2013.01); *C23C 16/50* (2013.01); *C23C 28/044* (2013.01); *C23C 28/32* (2013.01); *C23C 28/34* (2013.01); *C23C 28/345* (2013.01); *C23C 28/347* (2013.01)

(58) Field of Classification Search
CPC . C23C 14/35; C23C 14/5806; C23C 14/5853; C23C 28/32; C23C 28/322; C23C 28/34; C23C 28/345; C23C 28/347; C23C 28/044; C23C 30/005
See application file for complete search history.

(56) References Cited

U.S. PATENT DOCUMENTS

| | | | |
|---|---|---|---|
| 6,852,273 B2* | 2/2005 | Ivanov | .................... C22C 1/047 |
| | | | 419/48 |
| 2002/0037220 A1 | 3/2002 | Saint Ramond et al. | |
| 2006/0180082 A1 | 8/2006 | Iwamoto et al. | |
| 2010/0226783 A1* | 9/2010 | Lipkin | .................. C23C 28/322 |
| | | | 427/404 |
| 2012/0121926 A1 | 5/2012 | Chang et al. | |
| 2012/0164473 A1 | 6/2012 | Taylor et al. | |
| 2012/0171416 A1* | 7/2012 | Chang | .................. C23C 14/081 |
| | | | 204/192.15 |
| 2014/0106150 A1* | 4/2014 | Decker | ..................... G06F 3/03 |
| | | | 428/319.1 |
| 2020/0191002 A1 | 6/2020 | Saboundji et al. | |

FOREIGN PATENT DOCUMENTS

| | | |
|---|---|---|
| CN | 102400102 A | 4/2012 |
| CN | 102465255 A | 5/2012 |
| CN | 102925841 A | 2/2013 |
| CN | 110709536 A | 1/2020 |
| DE | 10 2012 002285 A1 | 8/2013 |
| FR | 3 065 968 A1 | 11/2018 |
| TW | 201229287 A | 7/2012 |

OTHER PUBLICATIONS

Pflumm, R., et al., "Oxidation protection of γ-TiAl-based alloys—A review," Intermetallics 56, (Year: 2015), pp. 1-14.

International Search Report as issued in International Patent Application No. PCT/FR2020/050708, dated Sep. 24, 2020.

Hornauer, U., et al., "Plasma immersion ion implantation of TiAl using chlorine containing plasma," Surface and Coatings Technology, 173 -174, (2003), pp. 1182-1186.

* cited by examiner

[Fig. 1]
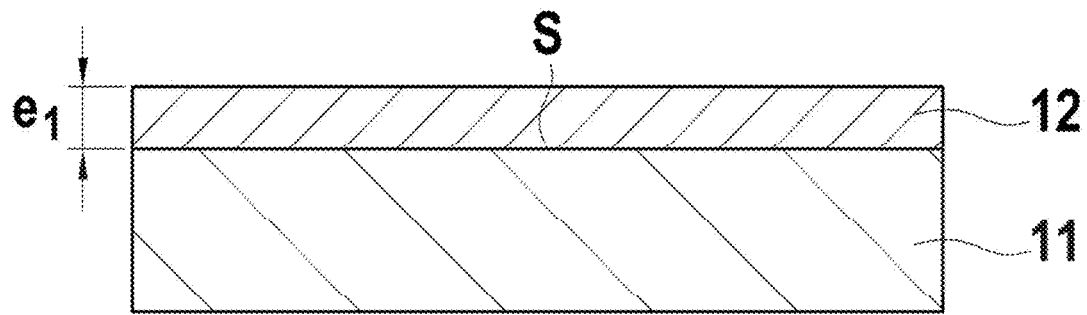
[Fig. 2]
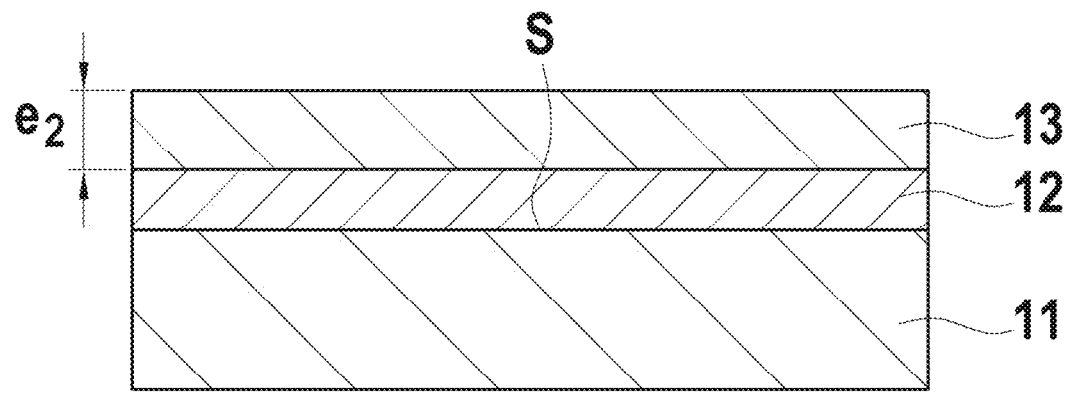
[Fig. 3]
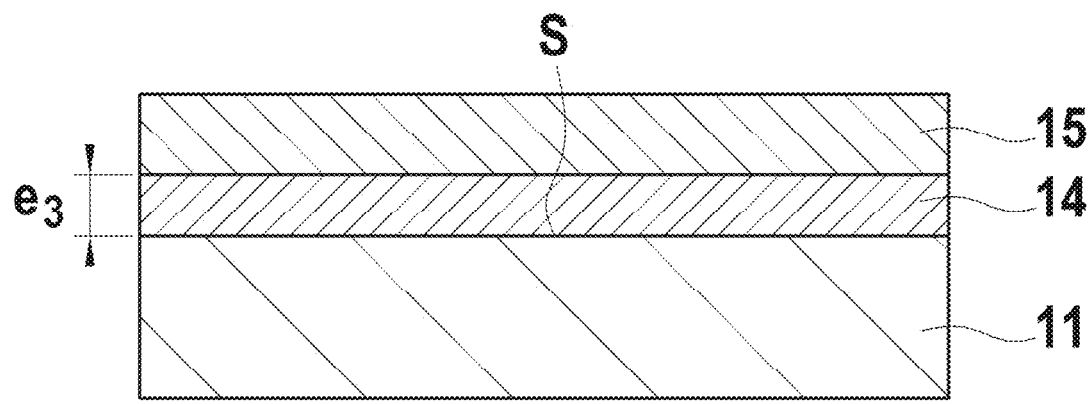

[Fig. 4]
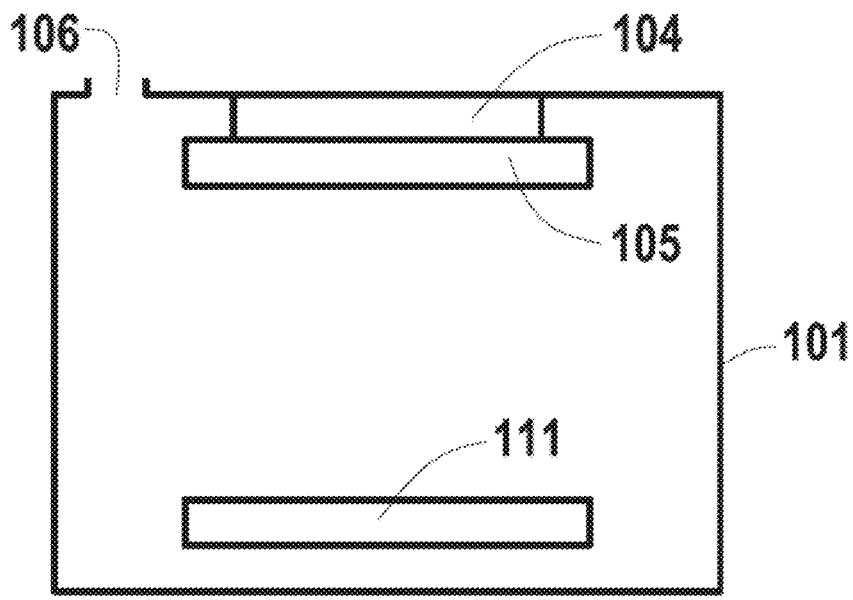
[Fig. 5]
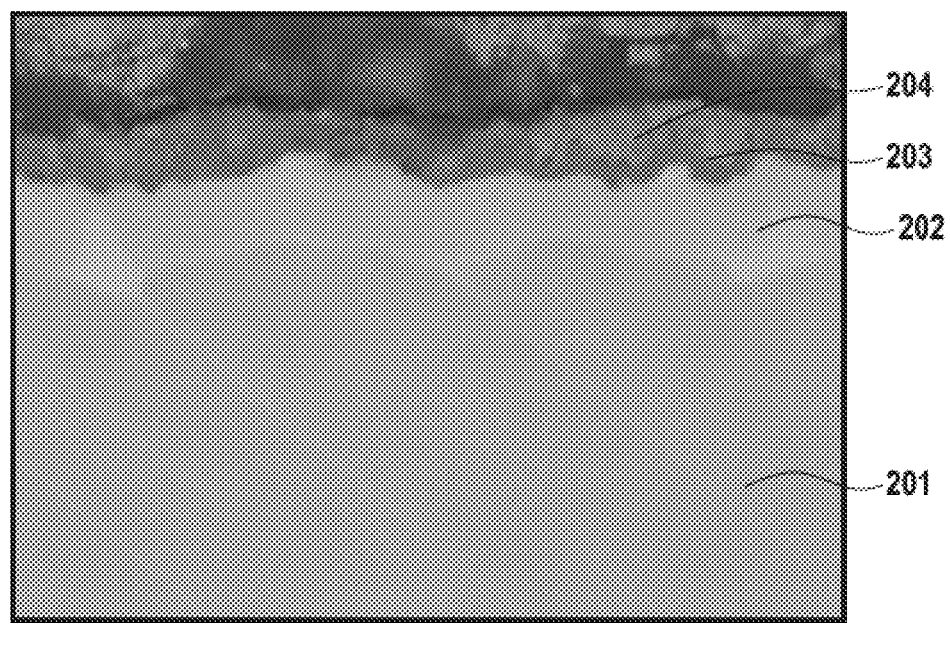

[Fig. 6]
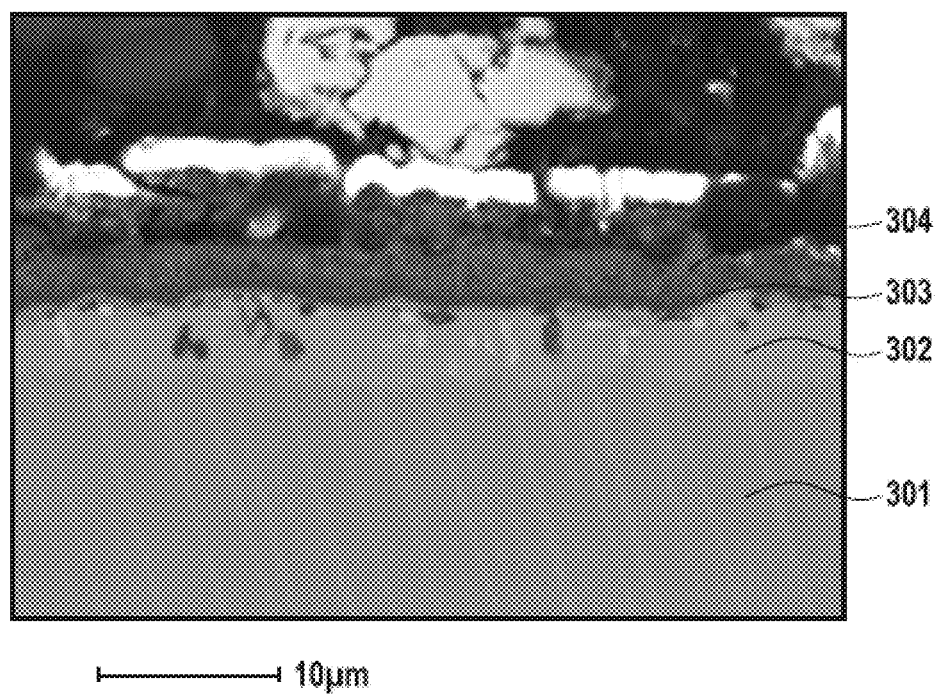

METHOD FOR FORMING A LAYER OF ALUMINA AT THE SURFACE OF A METALLIC SUBSTRATE

CROSS-REFERENCE TO RELATED APPLICATIONS

This application is the U.S. National Stage of PCT/FR2020/050708, filed Apr. 24, 2020, which in turn claims priority to Canadian patent application number 3,043,564 filed May 15, 2019. The content of these applications are incorporated herein by reference in their entireties.

TECHNICAL FIELD

The present invention concerns a method for forming a layer of alumina at the surface of a metallic substrate so as to confer to said substrate a protection against oxidation and corrosion at high temperature. The invention especially concerns the protection of a substrate intended to be used in an aeronautical turbomachine.

PRIOR ART

The use of nickel-based superalloys in aeronautical turbomachines is known. In light of reducing the weight of turbomachines, alloys comprising lighter metals, such as aluminium, have been developed. Examples include alloys based on titanium aluminide (also called TiAl), which have good mechanical characteristics and which are significantly lighter than nickel-based superalloys.

However, it is desirable to improve the resistance of these alloys to oxidation and corrosion at high temperature, i.e., temperatures higher than 800° C. Solutions to form a protective layer of alumina on the surface of these types of alloys have been developed. In particular, the publication of Homauer et al. (Surface and Coatings Technology, 2003, 174, p. 1182-1186) proposed a solution in which there is first implantation of chorine by a plasma process at the surface of the part in which the protective alumina layer is then formed. However, this solution has the disadvantage of leading to local aluminium depletion near the surface of the part during the formation of the alumina layer. This aluminium depletion may result in an undesirable alteration of the properties of the substrate at high temperature, especially due to the formation of fragile intermetallic phases which reduce the fatigue life of the material.

DISCLOSURE OF THE INVENTION

The present invention concerns a method for forming a layer of alumina on the surface of a metal alloy substrate comprising aluminium, the method comprising at least:
- depositing a first aluminium layer on a surface of the metallic substrate,
- depositing a second layer by vapour-phase deposition on the first layer, the second layer comprising aluminium, a halogen and oxygen, and
- heat treatment of the substrate coated with the first and second layers under oxidising atmosphere in order to form the layer of alumina at the surface of the metallic substrate.

The invention proposes a solution in which an intermediate layer of aluminium (first layer) is deposited on the substrate before depositing the second layer comprising aluminium, halogen and oxygen. This first layer provides aluminium to form the alumina layer during heat treatment under oxidising atmosphere. Due to this provision, the phenomenon of local aluminium depletion of the underlying metallic substrate encountered in the prior art is reduced or even eliminated.

In one example of embodiment, the thickness of the first layer is greater than or equal to 20 nm.

Such a thickness value advantageously makes it possible to reduce the phenomenon of aluminium depletion of the underlying substrate still further when the alumina layer is formed.

In one example of embodiment, the thickness of the first layer is less than or equal to 1000 nm, for example 500 nm.

Limiting the thickness of the first layer avoids any risk of the aluminium not diffusing from the first layer to the underlying substrate and inducing structural change therein.

In particular, the thickness of the first layer can be comprised between 20 nm and 1000 nm, for example between 20 nm and 500 nm.

In one example of embodiment, the second layer is deposited by a method chosen from among physical vapour deposition, chemical vapour deposition, plasma-enhanced chemical vapour deposition and case hardening.

The second layer comprises a compound of formula $AlO_nX_m$ wherein n and m are each strictly positive and X represents halogen.

In particular, the second layer may comprise a mixture of aluminium halide and aluminium oxyhalide, optionally with alumina.

In one example of embodiment, the halogen is fluorine. In this case, the second layer may comprise a compound of formula $AlO_nF_m$ wherein n and m are each strictly positive. In particular, the second layer may comprise a mixture of aluminium fluoride and aluminium oxyfluoride, optionally with alumina. As a variant, the halogen is chlorine.

In one example of embodiment, the thickness of the second layer is greater than or equal to 10 μm, preferably comprised between 10 μm and 50 μm. Such a thickness makes it possible to improve the growth of the alumina layer, on the one hand, and minimise the internal stresses in the layer, on the other hand, which allows the layer to avoid any risk of defective adhesion to the substrate.

In one example of embodiment, the second layer is deposited from a vapour phase comprising a halogen gas, oxygen and aluminium.

For example, the second layer is deposited from a vapour phase comprising fluorine, oxygen and aluminium. When the halogen is fluorine, the vapour phase can comprise $CF_4$, $C_2F_6$, $SiF_4$, $SF_6$ or a mixture of these compounds, as well as oxygen and aluminium.

As a variant, the second layer is deposited from a vapour phase comprising chlorine, oxygen and aluminium. When the halogen is chlorine, the vapour phase can comprise $SiCl_4$, $Cl_2$ or a mixture of these compounds, as well as oxygen and aluminium.

In one example of embodiment, the second layer is deposited by sputtering of a target comprising aluminium in an atmosphere comprising oxygen and halogen gas.

In one example of embodiment, the heat treatment is conducted at a temperature greater than or equal to 800° C.

In one example of embodiment, the metallic substrate is a titanium aluminide-based alloy.

In one example of embodiment, the metallic substrate is a turbomachine part, for example an aeronautical turbomachine part.

According to another of its aspects, the invention also concerns a coated metallic substrate comprising:
- a metal alloy substrate comprising aluminium,
- a first aluminium layer on a surface of the metallic substrate, and
- a second layer comprising aluminium, a halogen and oxygen, the second layer coating the first layer.

The coated metallic substrate introduced above is the intermediate product obtained when implementing the method described above with heat treatment under oxidising atmosphere.

In one example of embodiment, the first layer has a thickness greater than or equal to 20 rm. The thickness of the first layer can be less than or equal to 1000 nm, for example 500 nm. In particular, the thickness of the first layer can be comprised between 20 nm and 1000 nm, for example between 20 nm and 500 nm.

In one example of embodiment, the halogen of the second layer is fluorine.

In particular, the second layer may comprise a compound of formula $AlO_nF_m$ wherein n and m are each strictly positive. In particular, the second layer may comprise a mixture of aluminium fluoride and aluminium oxyfluoride, optionally with alumina.

DESCRIPTION OF THE FIGURES

FIG. 1 illustrates the substrate coated with the first aluminium layer after implementing a first step of an example of the method according to the invention.

FIG. 2 illustrates the substrate coated with the first and second layers after implementing a second step of an example of the method according to the invention.

FIG. 3 illustrates the substrate coated with an alumina layer of the surface obtained after heat treatment under oxidising atmosphere.

FIG. 4 schematically describes a device for vapour phase deposition of the layers onto a substrate that can be implemented in the context of the invention.

FIG. 5 shows a photograph obtained by scanning electron microscopy of the result obtained after implementing a method according to the invention.

FIG. 6 shows a photograph obtained by scanning electron microscopy of the result obtained after implementing a method not according to the invention in which the first aluminium layer is not deposited.

DESCRIPTION OF EMBODIMENTS

The present invention concerns the coating of a metal alloy substrate 11 of an alloy comprising aluminium. The treated substrate can be a titanium aluminide based alloy, such as a gamma-TiAl alloy.

The treated substrate can constitute a turbomachine part, for example an aeronautical turbomachine part. The substrate is intended to be used in oxidising atmosphere and at a temperature greater than or equal to 800° C. The substrate may, for example, be a turbine part. For example, it may be a turbine blade or a turbine ring sector.

First aluminium layer 12 is first of all deposited onto an external surface S of the substrate. First layer 12 can be deposited on contact of external layer S of the substrate. First layer 12 formed of elemental aluminium (Al) can be deposited by implementing a technique known in and of itself. In particular, it may be deposited by physical vapour deposition, for example by vacuum evaporation or by sputtering.

First aluminum layer 12 can be deposited by other deposition methods such as, for example, electrochemical deposition, chemical vapour deposition (CVD), plasma enhanced chemical vapour deposition (PECVD) or case hardening. The temperature imposed when depositing first layer 12 can be comprised between 20° C. and 600° C., for example between 20° C. and 400° C.

In one example of embodiment, first aluminium layer 12 can be deposited by radio-frequency magnetron sputtering, for example power equal to 200 W, under reduced pressure, for example 0.66 bar, by using an argon flow, for example 60 standard cubic centimeters per minute, and temperature of 400° C., for example.

First layer 12 can have a thickness $e_1$ comprised between 20 nm and 1000 nm.

Metallic substrate 11 coated with first layer 12 is illustrated in FIG. 1.

Second layer 13 comprising aluminium, a halogen and oxygen is then formed on first layer 12. Second layer 13 can be deposited in contact with first layer 12. First layer 12 is interposed between substrate 11 and second layer 13. Second layer 13 is formed by vapour deposition.

As indicated above, second layer 13 comprises a compound of formula $AlO_nX_m$ wherein n and m are each strictly positive and X represents halogen. Second layer 13 may comprise a mixture of aluminium halide and aluminium oxyhalide, optionally with alumina. The halogen can be fluorine or chlorine as indicated above.

Second layer 13 can comprise, in atomic percentages:
- 3% to 70% halogen, for example 55% to 65% halogen,
- 5% to 40% aluminium, for example 10% to 30% aluminium, and
- 1% to 20% oxygen, for example 3% to 15% oxygen.

Second layer 13 can have an atomic ratio between halogen and oxygen comprised between 2:1 and 8:1.

The inventors have observed that halogen is an activator of the alumina formation reaction by oxidation of the aluminium with oxygen.

Second layer 13 is made by vapour phase deposition, in particular by magnetron cathode sputtering. The temperature imposed when depositing second layer 13 can be comprised between 20° C. and 800° C., for example between 20° C. and 400° C.

FIG. 4 schematically shows a device to perform deposition by magnetron cathode sputtering.

Into a chamber 101, a gas is introduced by inlet 106 and a plasma is generated between target 105 and substrate 111 to be coated. Under the effect of an electrical field, obtained by imposing a voltage between target 105 and substrate 111, electrons are generated by the target and can ionise the atoms making up the plasma by collision. The presence of a magnetic field generated by a magnet 104 positioned near target 105 confines the generated electrons close to the target and increases the probability that a collision between an electron and an atom in the plasma will occur there. When such a collision has occurred, a high energy space is generated and this can bombard target 105 and tear particles from target 105 by elastic shock The particles of target 105 thus tom can then be deposited on substrate 111 to form the deposit.

Second layer 13 can be deposited under vacuum, for example at a pressure less than or equal to 10 Pa (75 mTorr), for example comprised between 0.67 Pa (5 mTorr) and 10 Pa (75 mTorr). During deposition, the following can be imposed:

a flow rate of oxygen injected into the chamber 101 comprised between 1 standard cm$^3$ per minute (sccm) and 100 standard cm$^3$ per minute, and a flow rate of halogen gas in chamber 101 comprised between 2.5 standard cm$^3$ per minute and 100 standard cm$^3$ per minute, and, optionally, a flow rate of inert gas injected into chamber 101 comprised between 1 standard cm$^3$ per minute and 100 standard cm$^3$ per minute.

The inert gas can be argon, for example.

In the case where the halogen is fluorine, the halogen gas can be chosen from $CF_4$, $C_2F_6$, $SiF_4$, $SF_6$ or a mixture of these compounds.

In the case where the halogen is chlorine, the halogen gas can be chosen from $SiCl_4$, du $Cl_2$ or a mixture of these compounds.

Second layer 13 can have a thickness $e_2$ greater than or equal to 0.1 µm, for example 10 µm, for example comprised between 10 µm and 100 µm.

FIG. 2 represents a substrate 11 coated with a first aluminium layer 12 and a second layer 13 such as described above.

Then a heat treatment is performed under an oxidising atmosphere so as to form alumina layer 14 on surface S of the metallic substrate.

The heat treatment can then be done at a temperature greater than or equal to 800° C., for example comprised between 800° C. and 1000° C., for example comprised between 850° C. and 900° C.

The heat treatment can be conducted under air. The heat treatment can be annealing.

As described above, due to the presence of aluminium layer 12, the growth of alumina layer 14 during heat treatment takes place while limiting or even eliminating aluminium depletion near substrate surface S.

At the end of heat treatment, and as shown schematically in FIG. 3, an alumina layer 14 is formed at surface S of metallic substrate 11.

The heat treatment can also be conducted at the formation on alumina layer 14 of a layer 15 comprising titanium, aluminium and oxygen.

In one example of embodiment, alumina layer 14 has a thickness $e_3$ comprised between 10 nm and 50,000 nm.

FIG. 5 is a photograph of a gamma-TiAl substrate 201 coated by implementing a method such as described above Substrate 201 is coated with alumina layer 203 and has a layer 204 at its surface comprising titanium, aluminium and oxygen.

For comparison purposes, FIG. 6 is a photograph of a gamma-TiAl substrate 301 coated with a layer of alumina 303 by a method not of the invention, not comprising the initial deposition of the aluminium layer. The substrate also has a layer 304 at its surface comprising titanium, aluminium and oxygen.

It can be observed that the implementation of the method described above significantly reduces the area depleted in aluminium (202 in FIGS. 5 and 302 in FIG. 6) present at the surface of the substrate during coating of a metal substrate.

In the examples presented in FIGS. 5 and 6, an effect is observed that the area depleted in aluminium near the coated surface substrate surface is 2 µm thick when the alumina layer is prepared by a method of the invention (area 202 FIG. 5), versus 4 µm when the alumina layer is prepared by a method not of the invention (area 302 FIG. 6).

In the present invention the expression "comprised between . . . and . . . " should be understood to include the limits unless explicitly stated otherwise.

The invention claimed is:

1. A method for forming a layer of alumina on a surface of a metal alloy substrate comprising aluminium, the method comprising:

depositing a first aluminium layer consisting of elemental aluminium on the surface of the metal alloy substrate wherein the metal alloy substrate is a titanium aluminide based alloy, depositing a second layer by vapour-phase deposition on the first aluminium layer, the second layer comprising aluminium, a halogen and oxygen wherein the second layer comprises in atomic percentages 55-65% halogen, 10-30% aluminum and 3-15% oxygen, the first and second layers being in direct contact, wherein the second layer is deposited from a gas phase comprising oxygen, a halogen gas and aluminium and wherein the second layer is deposited by sputtering of a target comprising aluminium in an atmosphere comprising oxygen and halogen gas, and heat treatment of the metal alloy substrate coated with the first and second layers under oxidising atmosphere in order to form the layer of alumina at the surface of the metal alloy substrate.

2. The method according to claim 1, wherein a thickness $e_1$ of the first aluminium layer is comprised between 20 nm and 1000 nm.

3. The method according to claim 1 wherein the halogen is fluorine.

4. The method according to claim 1, wherein the second layer has an atomic ratio between halogen and oxygen comprised between 2:1 and 8:1 and the halogen being an activator of the alumina formation reaction by oxidation of the aluminium with oxygen.

5. The method according to claim 1, wherein a thickness of the second layer is greater than or equal to 10 µm.

6. The method according to claim 1, wherein the heat treatment is conducted at a temperature greater than or equal to 800° C.

7. The method according to claim 1, wherein the metal alloy substrate is a turbomachine part.

8. The method according to claim 1, wherein the first aluminium layer is deposited by radio-frequency magnetron sputtering.

9. The method according to claim 1, wherein the second layer is deposited by radio-frequency magnetron sputtering.

* * * * *